United States Patent
Munemura et al.

(10) Patent No.: US 10,518,678 B2
(45) Date of Patent: Dec. 31, 2019

(54) HEADREST SUPPORT STRUCTURE

(71) Applicants: NHK SPRING CO., LTD., Yokohama-shi, Kanagawa (JP); SUBARU CORPORATION, Tokyo (JP)

(72) Inventors: Nozomu Munemura, Yokohama (JP); Tatsuhiro Takakusaki, Yokohama (JP); Takuya Hasegawa, Tokyo (JP); Naoki Endo, Tokyo (JP)

(73) Assignees: NHK Spring Co., Ltd., Yokohama-shi, Kanagawa (JP); Subaru Corporation, Tokyo (JP)

( * ) Notice: Subject to any disclaimer, the term of this patent is extended or adjusted under 35 U.S.C. 154(b) by 105 days.

(21) Appl. No.: 15/915,380

(22) Filed: Mar. 8, 2018

(65) Prior Publication Data
US 2018/0257530 A1   Sep. 13, 2018

(30) Foreign Application Priority Data

Mar. 10, 2017   (JP) ................. 2017-046675

(51) Int. Cl.
| | |
|---|---|
| *A47C 7/36* | (2006.01) |
| *B60R 22/28* | (2006.01) |
| *B60N 2/80* | (2018.01) |
| *B60N 2/897* | (2018.01) |

(52) U.S. Cl.
CPC ............ *B60N 2/80* (2018.02); *B60N 2/897* (2018.02); *B60N 2002/899* (2018.02)

(58) Field of Classification Search
CPC ........ B60N 2/888; B60N 2/815; B60N 2/897; B60N 2/818; B60N 2/844; B60N 2/809; B60N 2/4228; B60N 2/894; B60N 2/80
See application file for complete search history.

(56) References Cited

U.S. PATENT DOCUMENTS

| | | | | |
|---|---|---|---|---|
| 6,832,816 | B2 * | 12/2004 | Yamada ................ | B21C 37/065 297/391 |
| 7,370,915 | B2 * | 5/2008 | Droche ................. | B60N 2/818 297/463.1 |
| 8,864,235 | B2 * | 10/2014 | Menges .................. | A47C 7/38 297/404 |
| 9,187,017 | B2 * | 11/2015 | Ronzi .................... | B60N 2/812 |
| 9,428,089 | B2 * | 8/2016 | Weiland ................. | B60N 2/844 |
| 9,545,862 | B2 * | 1/2017 | Kitou .................... | B60N 2/838 |

(Continued)

FOREIGN PATENT DOCUMENTS

| | | |
|---|---|---|
| JP | 2015-20703 A | 2/2015 |
| JP | 5762179 B2 | 8/2015 |

*Primary Examiner* — Shin H Kim
(74) *Attorney, Agent, or Firm* — Knobbe, Martens, Olson & Bear, LLP

(57) ABSTRACT

A headrest support structure includes: a headrest body; a bushing; and a headrest stay, the bushing comprises a support section that supports the headrest stay in the bushing, and the support section includes: a fixed portion that is abutted against an outer peripheral face of the headrest stay, and a flexing portion that is provided on an opposite side of the headrest stay from the fixed portion, and that is capable of flexing so as to be abutted against the outer peripheral face of the headrest stay when the bushing has been inserted into the retention section and the headrest stay has been inserted into the bushing.

9 Claims, 10 Drawing Sheets

(56) References Cited

U.S. PATENT DOCUMENTS

| | | | | |
|---|---|---|---|---|
| 9,902,301 B2* | 2/2018 | Aquillue | ................ | B60N 2/809 |
| 10,099,589 B2* | 10/2018 | Takeuchi | ................ | B60N 2/80 |
| 2002/0038969 A1* | 4/2002 | Whitmore | ............... | B60N 2/821 |
| | | | | 297/391 |
| 2003/0222491 A1* | 12/2003 | Isaacson | ................ | B60N 2/815 |
| | | | | 297/410 |
| 2005/0184572 A1* | 8/2005 | Holdampf | ................ | B60N 2/80 |
| | | | | 297/391 |
| 2006/0012225 A1* | 1/2006 | Gans | ........................ | B60N 2/80 |
| | | | | 297/41 |
| 2006/0119163 A1* | 6/2006 | Gans | ...................... | B60N 2/826 |
| | | | | 297/463.1 |
| 2007/0145804 A1* | 6/2007 | Ichisugi | ................ | B60N 2/818 |
| | | | | 297/410 |
| 2009/0315371 A1* | 12/2009 | Shimizu | .................. | F16C 1/101 |
| | | | | 297/216.12 |
| 2011/0210594 A1* | 9/2011 | Eisenbraun | ............ | B60N 2/809 |
| | | | | 297/391 |
| 2014/0028072 A1* | 1/2014 | Ronzi | .................... | B60N 2/812 |
| | | | | 297/410 |
| 2014/0361595 A1* | 12/2014 | Weiland | ................. | B60N 2/844 |
| | | | | 297/410 |
| 2015/0329021 A1* | 11/2015 | Aquillue | ................. | B60N 2/80 |
| | | | | 297/391 |
| 2016/0031347 A1* | 2/2016 | Ronzi | .................... | B60N 2/812 |
| | | | | 297/410 |
| 2016/0166064 A1* | 6/2016 | Takahashi | .............. | A47C 7/383 |
| | | | | 297/404 |
| 2018/0257530 A1* | 9/2018 | Munemura | ............ | B60N 2/897 |

* cited by examiner

HEADREST SUPPORT STRUCTURE

CROSS-REFERENCE TO RELATED APPLICATION

This application is based on and claims priority under 35 USC 119 from Japanese Patent Application No. 2017-046675 filed on Mar. 10, 2017, the disclosure of which is incorporated by reference herein.

BACKGROUND

Technical Field

Preferred embodiments relate to a headrest support structure that supports the head of an occupant.

Related Art

Hitherto, structures in which a bushing is inserted into a tube-shaped retention section provided to a seatback, and a headrest stay is then inserted into a hole penetrating the bushing in the axial direction, have been employed to fix a headrest to a seatback (for example in Japanese Patent No. 5762179 and Japanese Patent Application Laid-Open (JP-A) No. 2015-20703).

In the structure described in Japanese Patent No. 5762179, a protrusion acting as a front restriction portion is provided to a length direction intermediate portion on the vehicle front side of the bushing (grommet), and a pair of protrusions acting as rear restriction portions are provided at both length direction end portions on the vehicle rear side of the bushing. A headrest stay is inserted into the bushing having the above structure, resulting in a bending rigidity of the headrest toward the vehicle front that is lower than a bending rigidity of the headrest toward the vehicle rear, such that the headrest undergoes greater displacement toward the vehicle front. This enables the time until the headrest makes contact with the head of an occupant in the event of a vehicle rear-end collision to be reduced.

In the structure described in JP-A No. 2015-20703, a vehicle rear side wall face is open at lower portions of a retention section (headrest holder) and a bushing (headrest support). Namely, lower end positions on the vehicle rear side of the retention section and the bushing are positioned higher up than lower end positions on the vehicle front side of the retention section and the bushing.

The headrest stay therefore readily tilts toward the vehicle front side, reducing the time until headrest makes contact with the head of an occupant.

However, in the structure described in Japanese Patent No. 5762179, the headrest stay is not gripped in the vehicle front-rear direction at any of the restriction portions (front restriction portion, rear restriction portions), as each of the restriction portions only abuts one side or the other in the vehicle front-rear direction. There is therefore a possibility of the headrest rattling. Input toward the vehicle rear acts on the headrest in a vehicle rear-end collision, the headrest stay is supported at the two locations of the rear restriction portion on the upper side and the front restriction portion. However, the distance between these two points is only around half of the total length of the bushing. This makes it difficult to secure a large bending rigidity with respect to the length of the bushing.

In the structure described in JP-A No. 2015-20703 on the other hand, when input toward the vehicle rear acts on the headrest in a vehicle rear-end collision, the headrest stay is supported by an upper end on the vehicle rear side of the bushing and a lower end on the vehicle front side of the bushing. Namely, the distance between the two points is the entire length of the bushing, thereby enabling sufficient bending rigidity to better secured than in the structure described in Japanese Patent No. 5762179. However, the wall faces of the retention section and the bushing are open at the lower end of the vehicle rear side of the bushing, and in cases in which excessive input toward the vehicle rear acts on the headrest, there is a possibility of the retention section and the bushing deforming. Moreover, since the headrest stay is not gripped at a lower portion by the bushing, there is a possibility of noise caused by the headrest wobbling accompanying flexing of an upper portion of the bushing.

SUMMARY

In consideration of the above circumstances, exemplary embodiments provide a headrest support structure capable of preventing rattling of a headrest, and capable of securing the performance of the headrest in a rear-end collision.

A headrest structure according to a first aspect includes a headrest body, a bushing, and a headrest stay. The headrest body is provided above a seatback and supports the head of an occupant. The bushing is inserted into a tube-shaped retention section provided at an upper end portion of the seatback. The headrest stay includes an upper end portion fixed to the headrest body and a lower end portion inserted into an insertion hole provided in the bushing such that the headrest stay enables movement of the headrest body in a vehicle up-down direction. The bushing includes a support section that support section supports the headrest stay in the bushing. The support section includes a fixed portion that is abutted against an outer peripheral face of the headrest stay, and a flexing portion that is provided on the opposite side of the headrest stay from the fixed portion, and that is capable of flexing so as to be abutted against the outer peripheral face of the headrest stay when the bushing has been inserted into the retention section and the headrest stay has been inserted into the bushing.

In the first aspect, the tube-shaped retention section is provided at the upper end portion of the seatback. The bushing that supports the headrest stay is inserted into the retention section. The bushing is also provided with the support portion that supports the headrest stay. The support portion includes the fixed portion that is abutted against the outer peripheral face of the headrest stay, and the flexing portion that is capable of flexing so as to be abutted against the outer peripheral face of the headrest stay. Moreover, the fixed portion and the flexing portion oppose each other across the headrest stay. Note that "flexing so as to be abutted against the outer peripheral face of the headrest stay" refers to, for example, flexing such that a portion facing the outer peripheral face of the headrest stay makes tight contact with the outer peripheral face.

When the bushing has been inserted into the retention section and the headrest stay has been inserted into the insertion hole in the bushing, the headrest stay is gripped by the fixed portion and the flexing portion, such that the headrest body is supported so as to be capable of moving in the up-down direction. The first aspect thereby enables rattling of the headrest to be prevented, and enables the performance of the headrest to be secured in a rear-end collision.

In a headrest support structure according to a second aspect, the flexing portion includes a recess extending in an insertion direction of the headrest stay in a face opposing an inner wall face of the retention section.

In the second aspect, the flexing portion includes the recess extending in the insertion direction of the headrest stay. The flexing portion therefore flexes readily to follow the outer peripheral face of the headrest stay, while adjusting the width of the recess enables the flex amount and the operation force of the headrest to be adjusted.

In a headrest support structure according to a third aspect, the support section includes a first support section and a second support section. The first support section is provided at the upper portion of the bushing, and supports the headrest stay with the flexing portion at a vehicle front side and with the fixed portion at a vehicle rear side. The second support section is provided at the lower portion of the bushing, and supports the headrest stay with the fixed portion at the vehicle front side and with the flexing portion at the vehicle rear side.

In the third aspect, in the support section at the upper portion of the bushing, the fixed portion is at the vehicle rear side, and in the support section at the lower portion of the bushing, the fixed portion is at the vehicle front side. In a vehicle rear-end collision, when force toward the vehicle rear arises due to the head contacting the headrest body, the headrest stay attempts to lean toward the vehicle rear, such that force toward the vehicle rear arises at the upper portion of the bushing and force toward the vehicle front arises at the lower portion of the bushing. Moreover, when force toward the vehicle rear arises in the headrest body, the fixed portions provided at the support sections at the upper portion and at the lower portion of the bushing resist this force, thereby suppressing tilting of the headrest stay toward the vehicle rear. Namely, bending rigidity can be secured in a rear-end collision.

Moreover, in the third aspect, in the support section at the upper portion of the bushing, the flexing portion is at the vehicle front side, and in the support section at the lower portion of the bushing, the flexing portion is at the vehicle rear side. When force toward the vehicle front arises in the headrest body due to recoil in a vehicle rear-end collision, the headrest stay attempts to lean toward the vehicle front. Accordingly, force toward the vehicle front arises at the upper portion of the bushing, and force toward the vehicle rear arises at the lower portion of the bushing. Moreover, when force toward the vehicle front arises in the headrest body, the flexing portions provided at the support sections at the upper portion and at the lower portion of the bushing flex, thereby ensuring tilting of the headrest stay toward the vehicle front.

In a headrest support structure according to a fourth aspect, the insertion hole in the bushing has a tapered profile prior to assembly of the bushing with the retention section and the headrest stay. A smallest internal diameter of the insertion hole in a vehicle front-rear direction is at one of the support sections of the first support section and the second support section. The insertion hole has a larger internal diameter in the vehicle front-rear direction at the other of the support sections of the first support section and the second support section than at the one support section. Moreover, the other support section includes, at the flexing portion, a protrusion that presses the flexing portion toward a fixed portion side when the bushing has been inserted into the retention section and the headrest stay has been inserted into the bushing.

In the fourth aspect, the insertion hole in the bushing has a tapered profile prior assembly of the bushing with the retention section and the headrest stay. Note that the cross-section profile of the insertion hole is not limited to being circular, and may be elliptical in shape. For the internal diameter of the insertion hole along the vehicle front-rear direction, the insertion hole may increase in diameter on progression from the first support section toward the second support section, or may increase in diameter on progression from the second support section toward the first support section.

Namely, prior to being assembled together with the retention section and the headrest stay, even if one of the support sections of the bushing has a dimension in which a gap is not formed between the insertion hole and the headrest stay, the other support section has a dimension that forms a gap between the insertion hole and the headrest stay. Moreover, in the fourth aspect, the flexing portion of the other support section includes the protrusion that presses the flexing portion toward the fixed portion side when the bushing has been inserted into the retention section and the headrest stay has been inserted into the bushing. Namely, at the other support section, the gap caused by the taper is closed by the protrusion, thereby preventing rattling of the headrest. The performance of the headrest in a rear-end collision is also secured.

In a headrest support structure of a fifth aspect, the other support section includes a first groove portion that partitions the fixed portion from the flexing portion at each vehicle width direction side of the other support section.

In the fifth aspect, the first groove portion that partitions the fixed portion from the flexing portion is provided at each vehicle width direction side at the other support section where a gap caused by the taper is formed between the insertion hole and the headrest stay. Moreover, the width of the first groove portion becomes narrower when the bushing has been inserted into the tube-shaped retention section and the headrest stay has been inserted into the insertion hole of the bushing. In other words, the fixed portion and the flexing portion approach each other. Namely, in the other support section, the flexing portion flexes so as to approach the fixed portion side, closing the gap formed due to the taper, and thereby preventing rattling of the headrest. The performance of the headrest in a rear-end collision is also secured.

In a headrest support structure of a sixth aspect, the other support section is the second support section. The bushing includes an anchor portion on each vehicle width direction side below the second support section, each anchor portion projecting from an outer wall face of the bushing, and anchoring the bushing to the retention section, and a second groove portion provided so as to run around each of the anchor portions in vehicle side view in order to house the anchor portion at the inner side of the outer wall face of the bushing. The first groove portion is connected to the second groove portion.

In the sixth aspect, the other support section where a gap caused by the taper is formed between the insertion hole and the headrest stay configures the second support section provided at the lower portion of the bushing. The anchor portions that project from an outer wall face of the bushing and anchor the bushing to the retention section are provided on each vehicle width direction side below the second support section. The anchor portions are housed at the inner side of the outer wall face of the bushing when the bushing has been inserted into the retention section. It is necessary for the anchor portions to project from the outer wall face of the bushing again when insertion of the bushing has been completed. Accordingly, the second groove portions are provided running around each of the anchor portions in vehicle side view.

According to the sixth aspect, the groove portion that partitions the fixed portion from the flexing portion is connected to the second groove portion described above. Accordingly, where the second groove portion is configured by a groove formed in the same direction as the first groove portion, the second groove portion functions not only to house the anchor portion at the inner side of the outer wall face of the bushing, but also functions to bring the fixed portion and the flexing portion closer together. Namely, imparting the second groove portion with two functions enables the total length of grooves formed in the bushing to be reduced, thereby enabling the rigidity of the bushing to be secured. Moreover, in the bushing, in cases in which grooves are formed by machining, reducing the total length of the grooves enables both manufacturing time of the bushing to be reduced and manufacturing costs of the bushing to be suppressed.

In a headrest support structure according to a seventh aspect, the support section makes tight contact between the support section and the headrest stay and between the support section and the retention section.

The seventh aspect has the feature that the support section and the headrest stay, and the support section and the retention section, are in tight contact with each other. Namely, since there is no gap formed between the members supporting the headrest body, rattling of the headrest can be prevented, and the performance of the headrest in a rear-end collision can be secured.

As described above, the headrest support structure according to the present invention enables rattling of a headrest to be prevented, and enables performance of the headrest in a rear-end collision to be secured.

BRIEF DESCRIPTION OF THE DRAWINGS

Exemplary embodiments of the present disclosure will be described in detail based on the following figures, wherein.

DETAILED DESCRIPTION

Explanation follows regarding a headrest support structure of an exemplary embodiment of the present disclosure, with reference to FIG. 1 to FIG. 7. Note that the arrow FR indicates the vehicle front side, the arrow RH indicates the vehicle right side, and the arrow UP indicates the upper side in a vehicle up-down direction.

Figure 1:
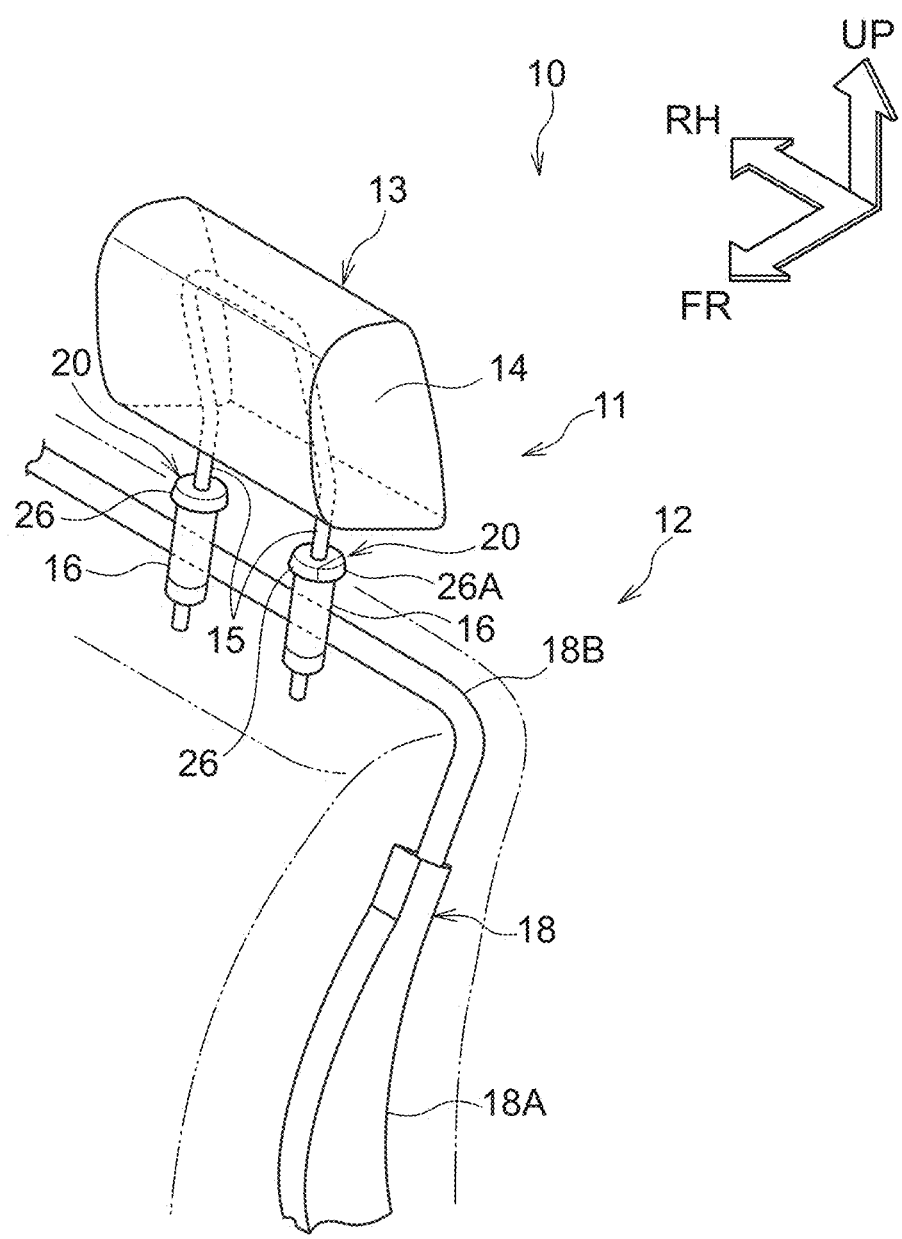
FIG. 1 is a perspective view illustrating a headrest support structure of an exemplary embodiment.

As illustrated in FIG. 1, a headrest 13 is provided above a seatback 12 of a vehicle seat 10 on which an occupant sits. The headrest 13 includes a headrest body 14 that supports the head H of an occupant, and a headrest stay 15 that allows the headrest body 14 to move in an up-down direction with respect to the seatback 12. The seatback 12 to which the headrest 13 is mounted includes a seatback frame 18 that forms a frame of the seatback 12, tube-shaped holders 16 provided at an upper end portion of the seatback frame 18, and a bushing 20 inserted into each holder 16. Out of the above configurations, the headrest body 14, the headrest stay 15, the holders 16, and the bushinges 20 are main configuration elements of a headrest support structure 11 of the present exemplary embodiment.

Headrest Body

Figure 2:
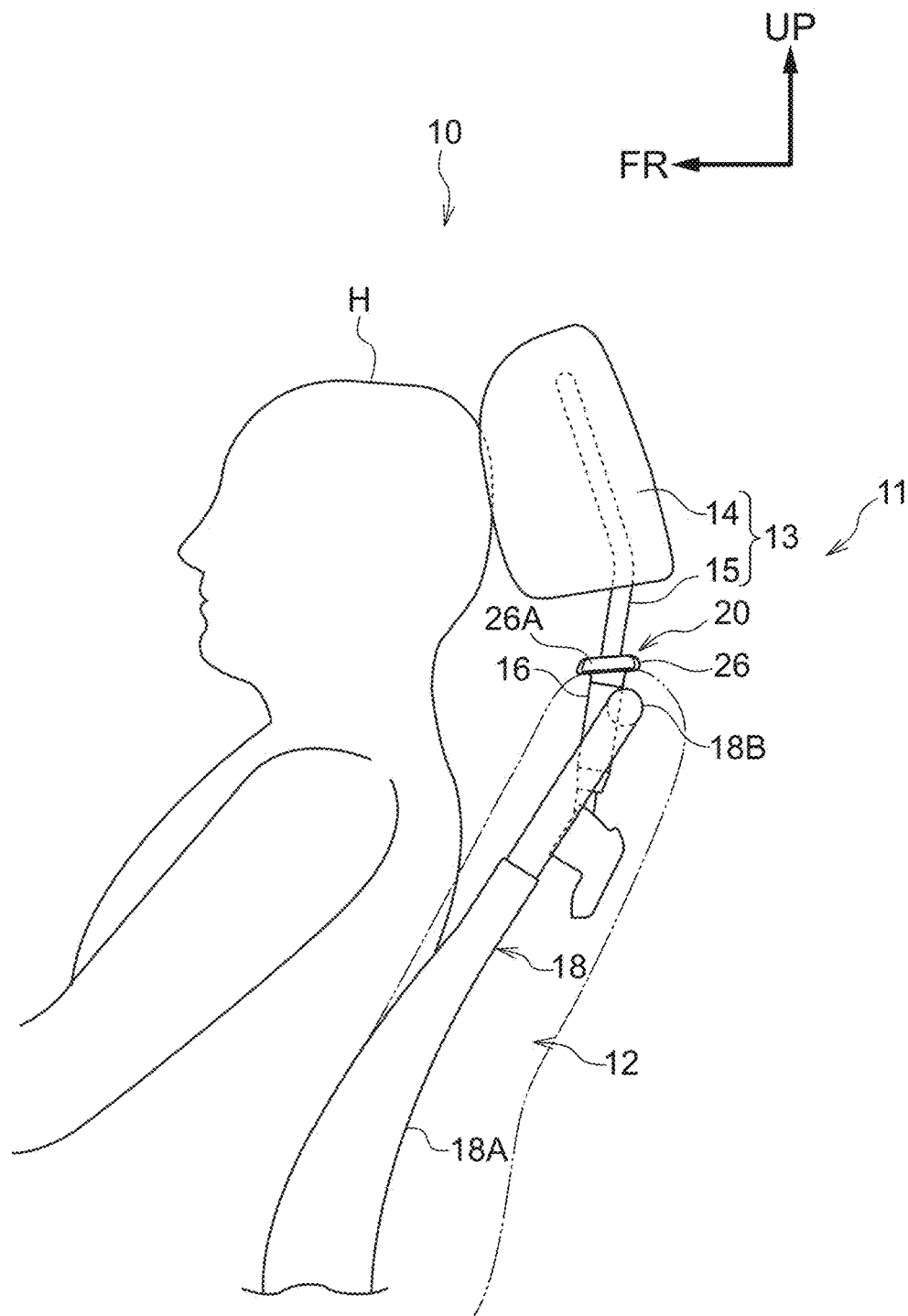
FIG. 2 is a side view illustrating a headrest support structure of an exemplary embodiment.

The headrest body 14 supports the head H of the occupant (see FIG. 2). As illustrated in FIG. 1, the headrest body 14 extends with its extension direction along the vehicle width direction, and has a barrel-like shape that is flattened in the vehicle front-rear direction. Specifically, the headrest body 14 is configured by a cushion material formed from urethane foam and covered by a covering material formed from fabric, leather, or the like. The cushion material is formed with a non-illustrated fixing groove used to fix the cushion material to an upper end side of the headrest stay 15. The covering material is attached to the cushion material after the cushion material has been fixed to the upper end side of the headrest stay 15.

Headrest Stay

The headrest stay 15 is, for example, formed by bending a steel pipe member. Specifically, as illustrated in FIG. 1 and FIG. 2, the headrest stay 15 is formed substantially in an inverted U-shape as viewed from the vehicle front, and is bent such that both length direction end portions are disposed toward the vehicle front as viewed from the vehicle width direction left side (see FIG. 2). Moreover, an upper end side of the headrest stay 15 (a portion extending along the vehicle width direction) is fixed to the headrest body 14, and a pair of support columns extend downward from the headrest body 14. The portions of the headrest stay 15 configuring the pair of support column portions are inserted into an insertion hole 21 provided at each bushing 20 in the axial direction. The bushinges 20 are inserted into the holders 16 provided at the upper end portion of the seatback 12. In this manner, the headrest 13 of the present exemplary embodiment is supported with respect to the seatback 12 through the bushinges 20 such that the headrest 13 is capable of moving in the vehicle up-down direction with respect to the seatback 12.

Note that in the following explanation, the headrest stay 15 is used to refer to the support column portions. The pair of support column portions of the headrest stay 15 of the present exemplary embodiment are formed in straight line shapes. A lock mechanism (not illustrated in the drawings)

provided at a stopper 26 of each bushing 20 prevents relative movement of the headrest stay 15 in the vehicle up-down direction. Moreover, a button 26A (see FIG. 4) to release the lock mechanism is provided at at least one stopper 26 in the pair of left and right bushinges 20. The button 26A is operated in order to allow movement of the headrest 13 in the vehicle up-down direction.

Seatback

The seatback 12 is reclinable, and projects up from a non-illustrated end portion of a seat cushion of the vehicle seat 10. The seatback 12 has a role of supporting the back of the occupant seated on the seat cushion. Specifically, in the seatback 12, a seatback pad formed from urethane foam is fixed to the seatback frame 18 that is formed in a rectangular shape as viewed from the front. Moreover, the surface of the seatback pad is covered by a covering material formed from fabric, leather, or the like.

Seatback Frame

The seatback frame 18 is coupled to a non-illustrated seat cushion frame provided within the seat cushion. The seatback frame 18 includes a pair of side frames 18A that are each bent into a substantially U-shaped cross-section (only the side frame 18A on the vehicle width direction left side is illustrated in FIG. 1). An upper frame 18B configured in an elongated pipe shape is provided above the side frames 18A. The upper frame 18B is bent substantially into an inverted U-shape as viewed from the front of the vehicle. The two end portions of the upper frame 18B are respectively fixed to the pair of side frames 18A.

Holders

As illustrated in FIG. 1 and FIG. 2, the holders 16, these being a pair of metal retention sections, are provided at respective positions at the vehicle front side of the upper end side (vehicle width direction extension portion) of the upper frame 18B. Each holder 16 is formed in a substantially rectangular tube shape, and is fixed to the upper frame 18B by welding. A vehicle front side wall of each holder 16 is formed with a groove 16A (see FIG. 5B) penetrating downward from an upper end from an inner wall face to an outer wall face of the holder 16. A guide protrusion 28, described later, is inserted through the groove 16A.

Bushing

Figure 3:
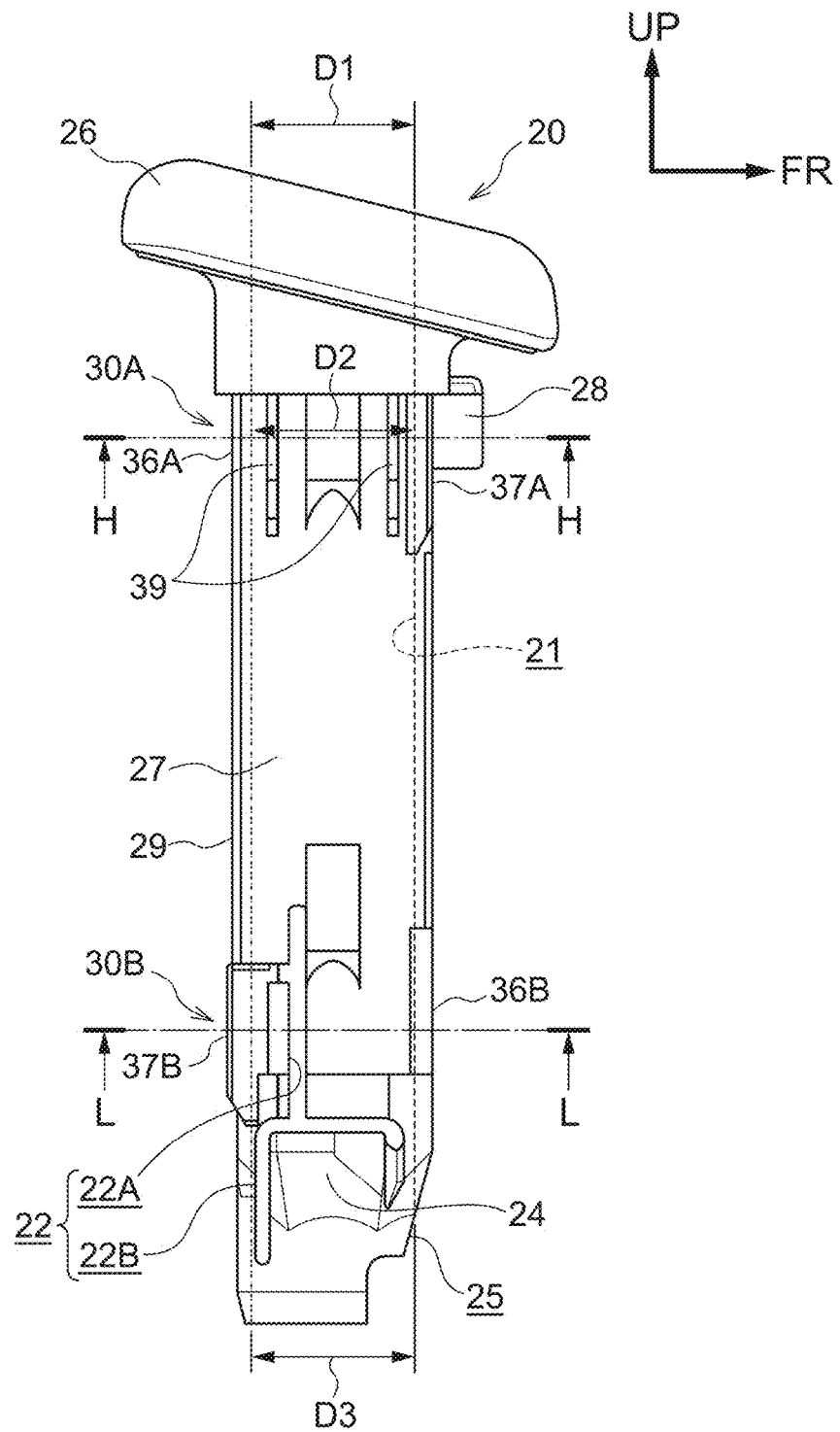
FIG. 3 is a side view of a bushing of a headrest support structure of an exemplary embodiment.
Figure 4:
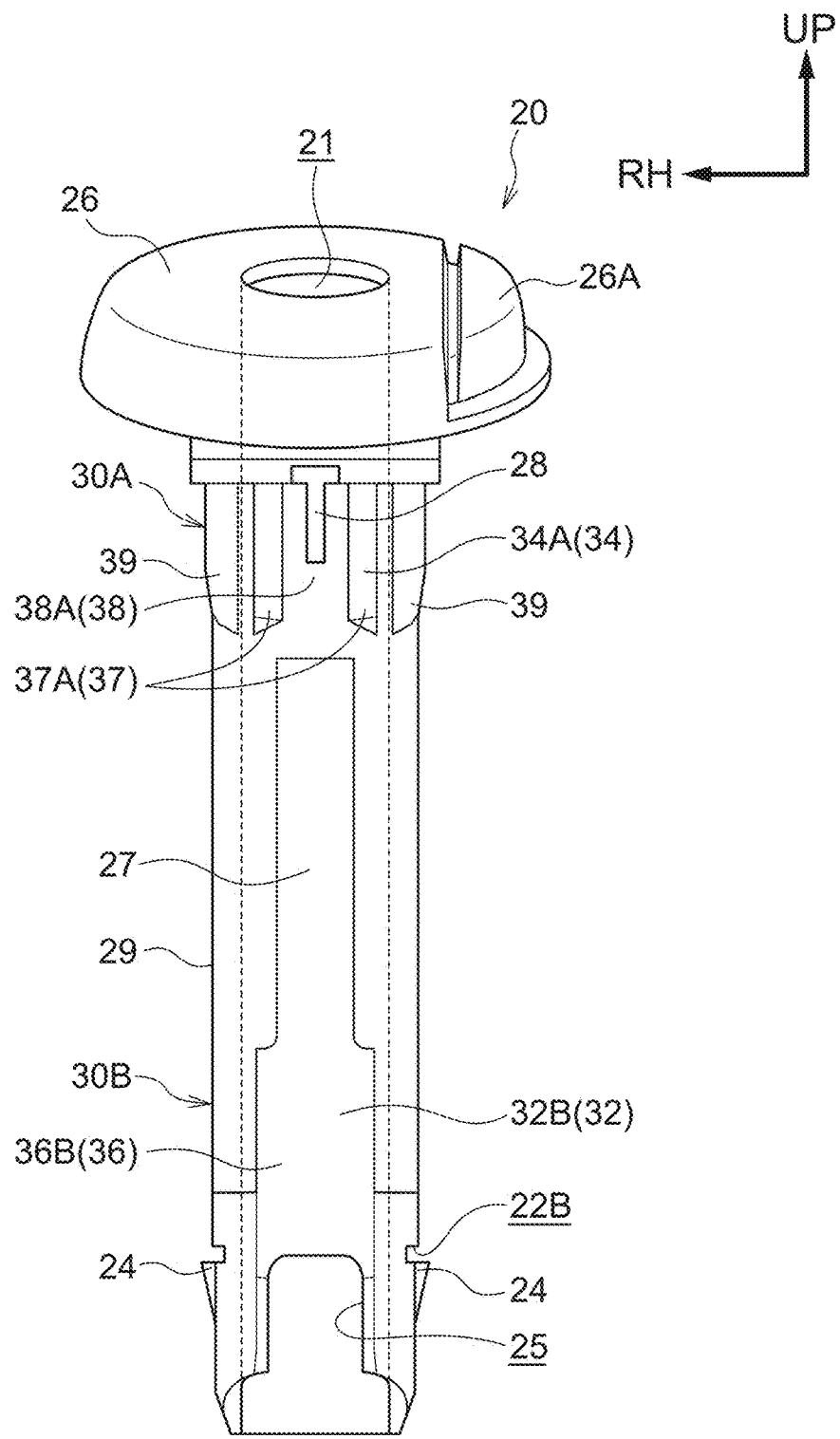
FIG. 4 is a front view of a bushing of a headrest support structure of an exemplary embodiment.

As illustrated in FIG. 1 and FIG. 2, the substantially rectangular tube-shaped bushinges 20 which are formed from resin are inserted inside the tubes of the pair of holders 16. As illustrated in FIG. 3 and FIG. 4, an insertion hole 21 into which the headrest stay 15 is inserted is provided running from an upper end to a lower end of each bushing 20. Moreover, the substantially circular plate shaped stopper 26 is provided inclining toward the vehicle front with respect to a horizontal plane at an upper portion of each bushing 20. A tube-shaped trunk 27 is provided below the stopper 26. Moreover, the guide protrusion 28 that projects toward the vehicle front is provided at the vehicle front side of an upper end of the trunk 27.

The insertion hole 21 in each bushing 20 of the present exemplary embodiment has a tapered shape (demolding taper) in order to facilitate removal from a mold after molding. Specifically, from a position at the height of a first support section 30A, described later (line H-H in FIG. 3), the diameter increases on progression toward the upper end, and the diameter also increases on progression downward. Namely, in the insertion hole 21 of the present exemplary embodiment, a mold used to form the insertion hole 21 is removed upward and downward about a parting line at the position of the height of the first support section 30A. For the internal diameter of the insertion hole 21 in the vehicle front-rear direction, then as illustrated in FIG. 3, an internal diameter D2 in the vehicle front-rear direction at the first support section 30A configures the smallest internal diameter of the insertion hole 21, and an internal diameter D1 at the upper end of the bushing 20 and an internal diameter D3 at a lower end of the bushing 20 are larger than the internal diameter D2.

As illustrated in FIG. 3, the lower portion of the bushing 20 is provided with a pair of grooves 22 penetrating left and right walls of the bushing 20 in the vehicle width direction. Each groove 22 includes a first groove portion 22A, this being a groove portion formed in the vehicle up-down direction, and a second groove portion 22B, this being another groove portion formed in a substantially L-shape. One end of the first groove portion 22A is connected to the second groove portion 22B where the groove extends in vehicle front-rear direction. Note that the first groove portions 22A partition a fixed portion 32B from a flexing portion 34B, described later, at both vehicle width direction ends. Moreover, each second groove portion 22B is provided running around an anchor portion 24 as viewed from the side of the vehicle. The anchor portions 24 anchor the bushing 20 to the holder 16. An upper end of each anchor portion 24 projects toward the exterior from an outer wall face 29 of the bushing 20 in a rectangular region around which the second groove portion 22B runs, and has an inclined face inclined toward the vehicle width direction inside of the bushing 20 on progression downward (see FIG. 4). Moreover, an upper end side of each anchor portion 24 is made capable of flexing in the vehicle width direction due to the second groove portion 22B, such that when inserting the bushing 20 into the holder 16, the anchor portion 24 is housed at the inner side of the outer wall face 29 of the bushing 20.

Moreover, a vehicle front side wall at the lower end of the bushing 20 is formed with an inclined face slanting toward the vehicle rear on progression downward, and an opening 25 (see FIG. 4) is provided at a portion of the wall face cut away to form the inclined face. The opening 25 prevents interference when inserting the headrest stay 15 into the bushing 20 when employing a headrest stay 15 that is bent slightly toward the vehicle rear side at a substantially central portion in the up-down direction.

When mounting the bushing 20 to the seatback 12, the bushing 20 is inserted from the upper end side of the holder 16. During insertion of the bushing 20, the inclined faces of the anchor portions 24 contact an upper end portion of the holder 16, such that the anchor portions 24 are housed at the inner side of the outer wall face 29 while flexed toward the vehicle width direction inside of the bushing 20 during insertion into the holder 16. Then, when the stopper 26 is inserted and abuts an upper end of the holder 16, the anchor portions 24 project from a lower end side of the holder 16 toward the vehicle width direction outside of the bushing 20. Then, a wall face formed at an upper end of each anchor portion 24 anchors to a lower end face of the holder 16, thereby retaining the bushing 20 inside the holder 16 in a state restrained in the up-down direction. Note that if the bushing 20 is inserted into the holder 16 in an incorrect orientation, the guide protrusion 28 abuts the upper end of the holder 16, preventing the stopper 26 from being inserted far enough to abut the upper end of the holder 16. Namely, the bushing 20 cannot be assembled in any orientation other than the orientation in which the guide protrusion 28 is capable of being inserted into the groove 16A.

Support Sections

Figure 5A:
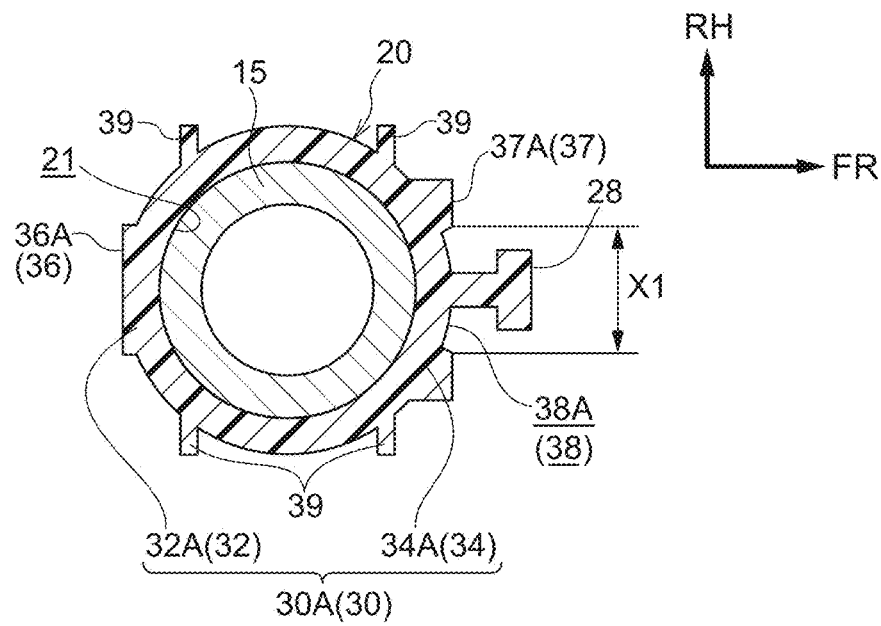
FIG. 5A is a cross-section from below of a first support section and a headrest stay of a headrest support structure of an exemplary embodiment.
Figure 5B:
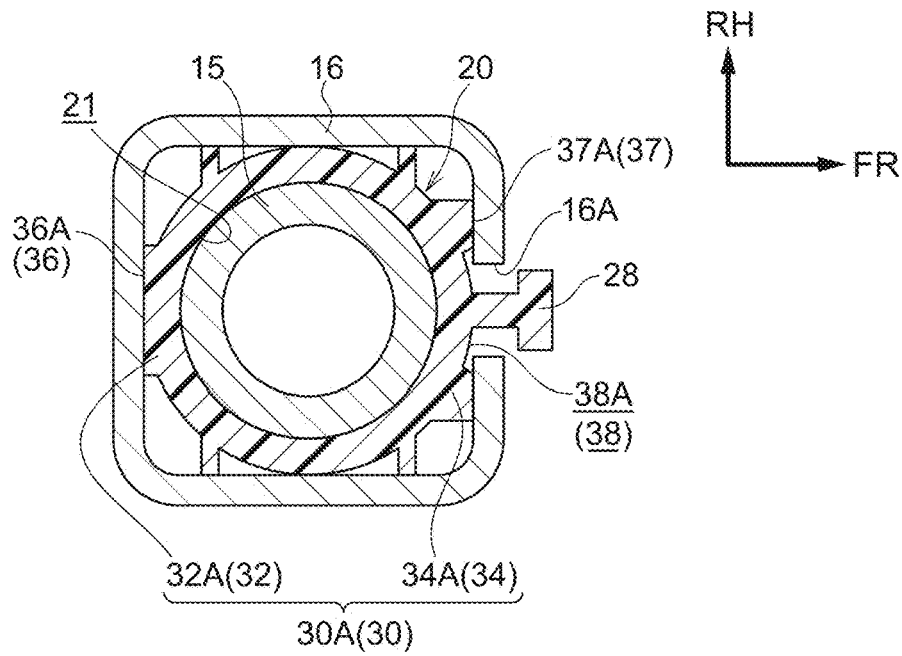
FIG. 5B is a cross-section from below of a holder, a first support section and a headrest stay of a headrest support structure of an exemplary embodiment.

Each bushing 20 of the present exemplary embodiment is provided with a support section 30 that supports the headrest stay 15 inserted into the insertion hole 21 such that the headrest stay 15 is capable of moving in the vehicle up-down direction. As illustrated in FIG. 3, FIG. 5A, and FIG. 5B, each support section 30 includes a fixed portion 32 that abuts an outer peripheral face of the headrest stay 15, and a flexing portion 34 that is capable of flexing so as to follow the outer peripheral face of the headrest stay 15 when the bushing 20 is inserted into the holder 16 and headrest stay 15 is inserted into the insertion hole 21 of the bushing 20. The flexing portion 34 is provided on the opposite side of the headrest stay 15 from the fixed portion 32. Namely, a structure is configured in which the headrest stay 15 is gripped between the fixed portion 32 and the flexing portion 34. Note that a flat portion 36 is provided at an outer wall face of the fixed portion 32 that faces an inner wall face of the holder 16. An outer wall face of the flexing portion 34 that faces the inner wall face of the holder 16 is provided with a pair of projections 37, and a recess 38 that is interposed between the projections 37 and configures a groove extending along the insertion direction of the headrest stay 15.

Due to providing the outer wall face side of the flexing portion 34 of the present exemplary embodiment with the recess 38, the flexing portion 34 flexes in the following manner when the bushing 20 is inserted into the holder 16 and the headrest stay 15 is inserted into the insertion hole 21 of the bushing 20. Namely, since apply a force toward the inner wall face side of the projections 37 and apply a force to the inner wall face of the flexing portion 34 from the headrest stay 15, flexes the flexing portion 34 about the recess 38, such that the flexing portion 34 follows the outer peripheral face of the headrest stay 15. However, the fixed portion 32 does not flex so as to follow the outer peripheral face of the headrest stay 15 in the same manner as the flexing portion 34.

The support sections 30 of the bushing 20 of the present exemplary embodiment include the first support section 30A at the upper portion of the bushing 20, and a second support section 30B, provided at the lower portion of the bushing 20. Specifically, the first support section 30A is provided at the position of the smallest internal diameter of the insertion hole 21 in the vehicle front-rear direction, and the second support section 30B is provided lower down, at a position where the vehicle front-rear direction internal diameter of the insertion hole 21 is larger than at the first support section 30A.

First Support Section

The first support section 30A is provided at the upper portion of the bushing 20, and supports the headrest stay 15 with a flexing portion 34A on the vehicle front side and a fixed portion 32A on the vehicle rear side. FIG. 5A and FIG. 5B are cross-sections viewed from below the first support section 30A (cross-sections along H-H in FIG. 3). FIG. 5A is a diagram illustrating a relationship between the bushing 20 and the headrest stay 15 prior to insertion of the bushing 20 into the holder 16. Although in reality, the headrest stay 15 is not inserted into the bushing 20 prior to insertion of the bushing 20 into the holder 16, FIG. 5A illustrates this relationship between the two components in order to illustrate the contact state between the bushing 20 and the headrest stay 15. Moreover, FIG. 5B is a diagram illustrating the relationship between the holder 16, the bushing 20, and the headrest stay 15 when the holder 16, the bushing 20, and the headrest stay 15 have been assembled together.

As illustrated in FIG. 5A, the fixed portion 32A includes a circular arc shaped inner wall face configuring the insertion hole 21, and an outer wall face including a flat portion 36A. The flexing portion 34A includes a circular arc shaped inner wall face configuring the insertion hole 21, and an outer wall face including a projection 37A at each end in the seat width direction. A recess 38A configured by a portion recessed toward the vehicle rear side relative to the projections 37A is interposed between the projections 37A. Note that the guide protrusion 28 is formed projecting toward the vehicle front from the vehicle width direction center of the recess 38A. Moreover, a pair of ribs 39 are provided on each vehicle width direction-facing side face of the first support section 30A.

Prior to insertion of the bushing 20 into the holder 16A, a state between the fixed portion 32A and the headrest stay 15 and a state between the flexing portion 34A and the headrest stay 15 are as follows. Namely, as illustrated in FIG. 5A, the inner wall face of the fixed portion 32A (the insertion hole 21) and the outer peripheral face of the headrest stay 15 are in contact with each other. Moreover, the inner wall face of the flexing portion 34A (the insertion hole 21) and the outer peripheral face of the headrest stay 15 are in contact with each other.

When the bushing 20 has been inserted into the holder 16 and the headrest stay 15 has been inserted into the insertion hole 21 of the bushing 20, a state between the fixed portion 32A and the headrest stay 15 and a state between the flexing portion 34A and the headrest stay 15 are as follows. Namely, as illustrated in FIG. 5B, the inner wall face of the fixed portion 32A (the insertion hole 21) and the outer peripheral face of the headrest stay 15 are in tight contact with each other. Moreover, the flat portion 36A of the fixed portion 32A and the inner wall face of the holder 16 are in tight contact with each other. The inner wall face of the flexing portion 34A (the insertion hole 21) and the outer peripheral face of the headrest stay 15 are also in tight contact with each other. The projections 37A of the flexing portion 34A and the inner wall face of the holder 16 are in tight contact with each other. Note that leading end portions of the ribs 39 provided on the vehicle width direction-facing side faces of the first support section 30A abut inner wall faces of the holder 16.

Second Support Section

Figure 6A:
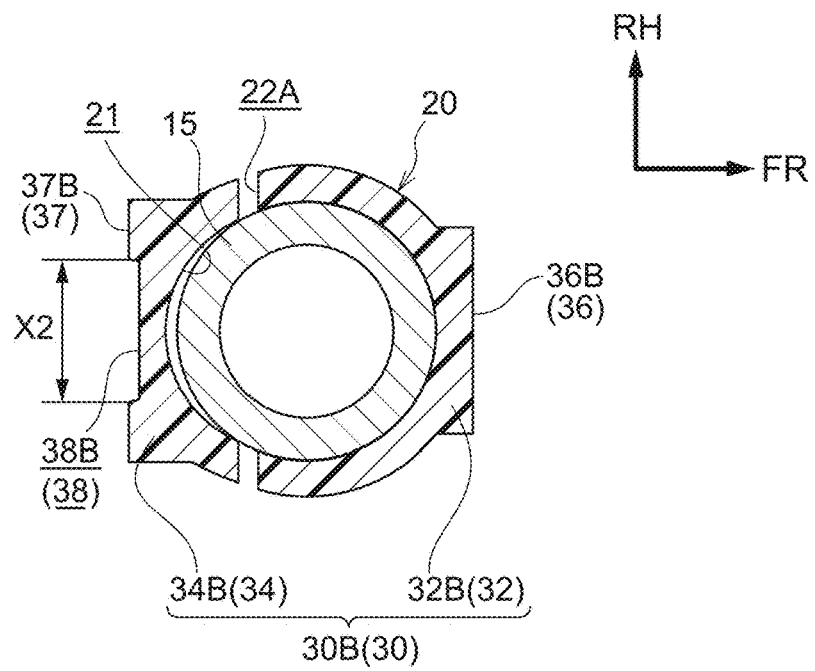
FIG. 6A is a cross-section from below of a second support section and a headrest stay of a headrest support structure of an exemplary embodiment.
Figure 6B:
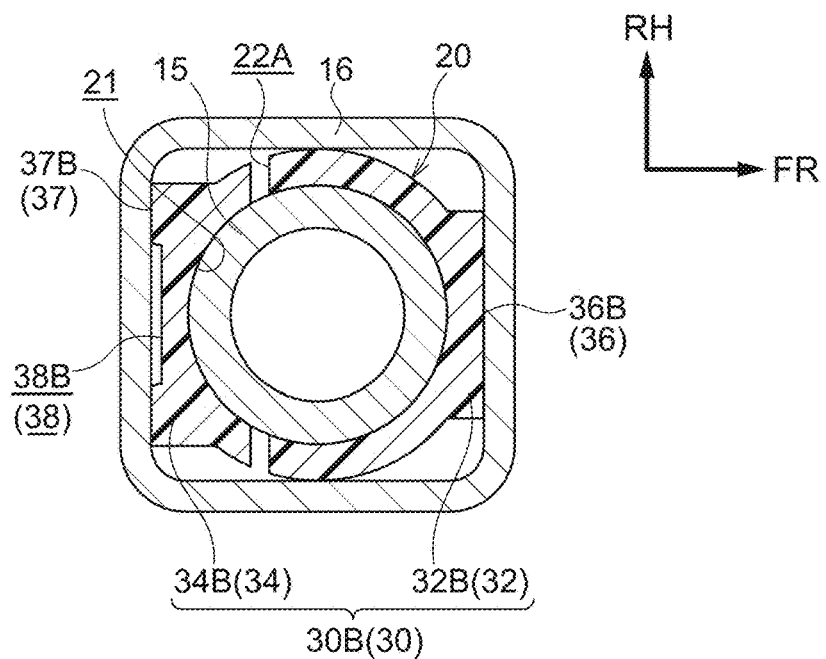
FIG. 6B is a cross-section from below of a holder, a second support section and a headrest stay of a headrest support structure of an exemplary embodiment.

The second support section 30B is provided at the lower portion of the bushing 20, and supports the headrest stay 15 with the fixed portion 32B on the vehicle front side and the flexing portion 34B on the vehicle rear side. Note that in the second support section 30B, the fixed portion 32B and the flexing portion 34B are partitioned by the first groove portions 22A. FIG. 6A and FIG. 6B are cross-sections viewed from below the second support section 30B (cross-sections along L-L in FIG. 3). FIG. 6A is a diagram illustrating a relationship between the bushing 20 and the headrest stay 15 prior to insertion of the bushing 20 into the holder 16. Although in reality, the headrest stay 15 is not inserted into the bushing 20 prior to insertion of the bushing 20 into the holder 16, FIG. 6A illustrates this relationship between the two components in order to illustrate the contact state between the bushing 20 and the headrest stay 15. Moreover, FIG. 6B is a diagram illustrating the relationship between the holder 16, the bushing 20, and the headrest stay 15 when the holder 16, the bushing 20, and the headrest stay 15 have been assembled together.

As illustrated in FIG. 6A, the fixed portion 32B includes a circular arc shaped inner wall face configuring the insertion hole 21, and an outer wall face that includes the flat portion 36B. The flexing portion 34B includes a circular arc shaped inner wall face configuring the insertion hole 21, and an outer wall face that includes a projection 37B, serving as a protrusion, at each end in the seat width direction. Note that the projections 37B of the present exemplary embodiment project out further than the outer wall face 29 (see FIG. 3). Moreover, a recess 38B configured by a portion recessed toward the vehicle front side relative to the projections 37B is interposed between the projections 37B. Note that in the present exemplary embodiment, the opening 25 is formed in a lower end of the flat portion 36B (see FIG. 4).

Prior to insertion of the bushing 20 into the holder 16, a state between the fixed portion 32B and the headrest stay 15 and a state between the flexing portion 34B and the headrest stay 15 are as follows. Namely, as illustrated in FIG. 6A, the inner wall face of the fixed portion 32B (the insertion hole 21) is in contact with the outer peripheral face of the headrest stay 15, or a slight gap is present therebetween. A gap is present between the inner wall face of the flexing portion 34B (the insertion hole 21) and the outer peripheral face of the headrest stay 15. As described above, in the present exemplary embodiment, the insertion hole 21 is provided with the demolding taper from the first support section 30A toward the lower end (the second support section 30B). A gap is formed between the inner wall face of the flexing portion 34B (the insertion hole 21) and the outer peripheral face of the headrest stay 15 as a result.

When the bushing 20 has been inserted into the holder 16 and the headrest stay 15 has been inserted into the insertion hole 21 of the bushing 20, a state between the fixed portion 32B and the headrest stay 15 and a state between the flexing portion 34B and the headrest stay 15 are as follows. Namely, as illustrated in FIG. 6B, the inner wall face of the fixed portion 32B (the insertion hole 21) and the outer peripheral face of the headrest stay 15 are in tight contact with each other. Moreover, the flat portion 36B of the fixed portion 32B and the inner wall face of the holder 16 are in tight contact with each other. The inner wall face of the flexing portion 34B (the insertion hole 21) and the outer peripheral face of the headrest stay 15 are also in tight contact with each other. Moreover, the projections 37B of the flexing portion 34B and the inner wall face of the holder 16 are in tight contact with each other. To explain further, in the second support section 30B of the present exemplary embodiment, when the bushing 20 has been inserted into the holder 16 and the headrest stay 15 has been inserted into the insertion hole 21 of the bushing 20, the projections 37B that project out further than the outer wall face 29 press the flexing portion 34B toward the fixed portion 32B side. Accordingly, the gap that was previously present between the inner wall face of the flexing portion 34B (the insertion hole 21) and the outer peripheral face of the headrest stay 15 is closed off and the two components make tight contact with each other.

Operation and Advantageous Effects

The headrest support structure 11 of the present exemplary embodiment has the following features, and exhibits operation and advantageous effects relating to these features.

Feature 1

The headrest support structure 11 of the present exemplary embodiment has the feature of a large distance between support points when load toward the vehicle rear side acts on the headrest body 14. Explanation follows regarding a comparative example of a headrest support structure of related technology, and a comparison between the comparative example and the present exemplary embodiment.

Figure 9A:
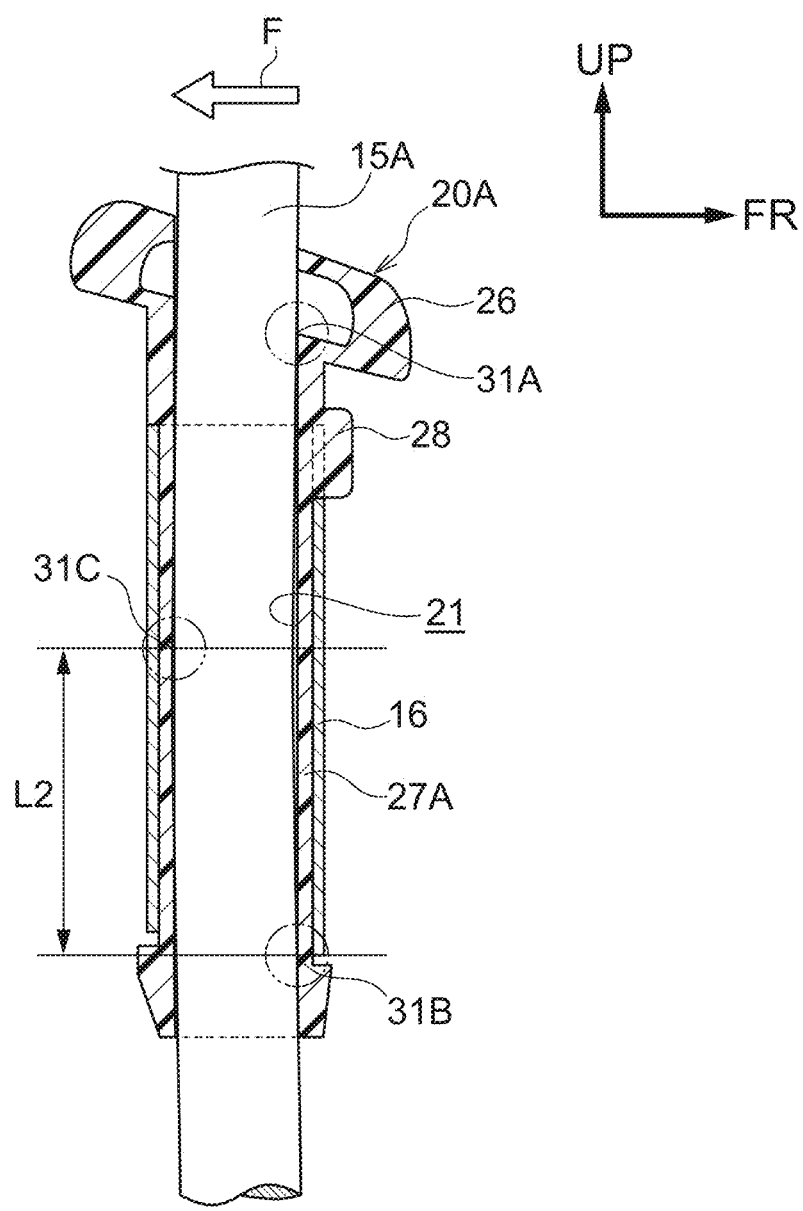
FIG. 9A and FIG. 9B are side cross-sections illustrating a state in which a headrest stay has been inserted into a bushing in a headrest support structure of a comparative example.

FIGS. 9 illustrate a headrest support structure of related technology as the comparative example. Note that in the comparative example, configurations that are the same as those of the headrest support structure 11 of the present exemplary embodiment are allocated the same reference numerals. As illustrated in FIG. 9A, a headrest stay 15A of the comparative example is bent slightly toward the vehicle rear side at a substantially central portion in the up-down direction. Moreover, a trunk 27A of a bushing 20A into which the headrest stay 15A is inserted is formed in a tube shape, and anchor portions 24A are formed at a lower portion of the trunk 27A. Moreover, when the headrest stay 15A is inserted into the bushing 20A, the headrest stay 15A is supported by the bushing 20A at three points. Specifically, the headrest stay 15A is normally supported at the three points of a support point 31A at an upper end portion on the vehicle front side of the trunk 27A, a support point 31B at a lower end portion on the vehicle front side of the trunk 27A, and a support point 31C at substantially the up-down direction center on the vehicle rear side of the trunk 27A (see the circled regions in FIG. 9A). When input toward the vehicle rear acts on the headrest body 14 in a vehicle rear-end collision (see arrow F in FIG. 9A), the headrest stay 15A is supported at the two points of the support point 31B and the support point 31C. When this occurs, a vertical distance L2 between the two points of the support point 31B and the support point 31C is half the distance between the support point 31A and the support point 31B, or in other words, a distance of approximately half the length of the trunk 27A.

Figure 7:
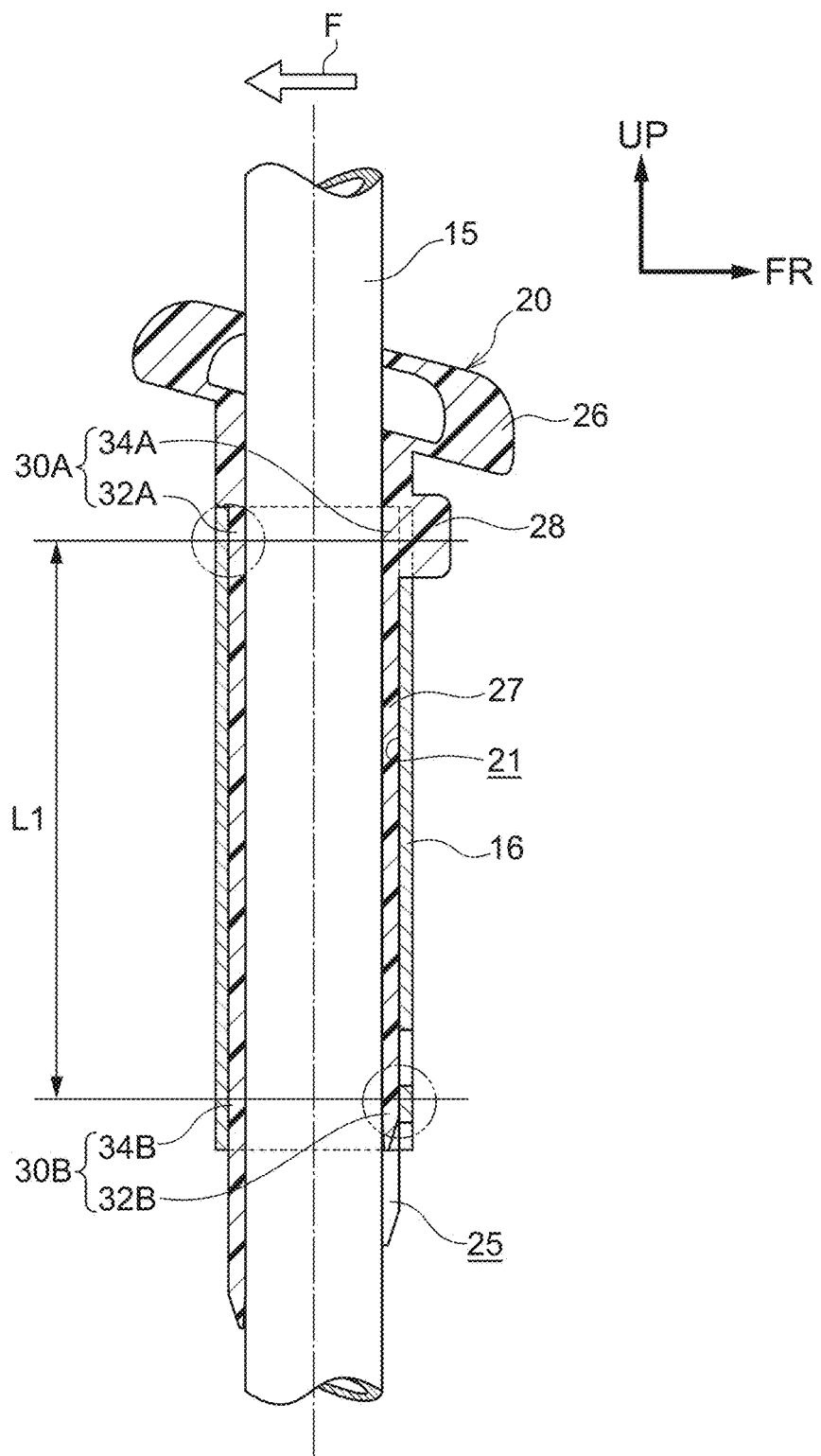
FIG. 7 is a side cross-section illustrating a state in which a headrest stay has been inserted into a bushing in a headrest support structure of an exemplary embodiment.

However, in the headrest support structure 11 of the present exemplary embodiment, as illustrated in FIG. 7, the headrest stay 15 is normally supported at a total of four locations, namely the fixed portion 32A and the flexing portion 34A at the upper portion of the bushing 20, and the fixed portion 32B and the flexing portion 34B at the lower portion of the bushing 20. When input toward the vehicle rear acts on the headrest body 14 in a rear-end collision (see the arrow F in FIG. 9A), the headrest stay 15 is supported at the two points of the fixed portion 32A and the fixed portion 32B (see the circled portions in FIG. 7). When this occurs, a vertical distance L1 between the two points of the fixed portion 32A and the fixed portion 32B is almost the same as the length of the trunk 27.

In the present exemplary embodiment and the comparative example, if the lengths of the trunk 27 and the trunk 27A are equivalent, the vertical distance L1 of the present exemplary embodiment is approximately twice the vertical distance L2 of the comparative example. Namely, the present exemplary embodiment enables the distance between two support points of the headrest stay to be made longer than in the comparative example. Accordingly, the present exemplary embodiment exhibits greater bending rigidity than the comparative example, enabling a greater force acting as a result of the head H contacting the headrest body 14 in a vehicle rear-end collision to be withstood.

Feature 2

The present exemplary embodiment has the feature that the headrest stay 15 is gripped between the fixed portions 32 and the flexing portions 34 provided at the support sections 30 (first support section 30A, second support section 30B) that are provided at the bushing 20 at two locations. Moreover, the present exemplary embodiment also has the feature that the flat portion 36 is provided at the outer wall face of each fixed portion 32, and the projections 37 and the recess 38 are provided at the outer wall face of each flexing portion 34.

Prior to assembling the holder 16, the bushing 20, and the headrest stay 15 together, the support sections 30 (fixed portions 32, flexing portions 34) are in contact with the headrest stay 15 (see FIG. 5A and FIG. 6A), but do not grip the headrest stay 15. However, when the bushing 20 has been inserted into the holder 16, and the headrest stay 15 has been inserted into the insertion hole 21 of the bushing 20, the support sections 30 grip the headrest stay 15 (see FIG. 5B and FIG. 6B). To be more specific, when the bushing 20 has been inserted into the holder 16 and the headrest stay 15 has been inserted into the insertion hole 21 of the bushing 20, the projections 37 of the flexing portion 34 are pressed toward the headrest stay 15 side. Accordingly, the flexing portion 34 flexes about the recess 38 so as to follow the outer peripheral face of the headrest stay 15. In this manner, the headrest stay 15 is gripped between the flexing portions 34 and the fixed portions 32 when the holder 16 has been inserted into the bushing 20 and the headrest stay 15 has been inserted into the insertion hole 21 of the bushing 20.

In an assembled state of the headrest 13, the support sections 30 and the headrest stay 15, and the support sections 30 and the holder 16 can be placed in tight contact with each other. Moreover, as illustrated in FIG. 7, the headrest stay 15 is normally supported at a total of four locations, namely at the fixed portion 32A and the flexing portion 34A at the upper portion of the bushing 20, and at the fixed portion 32B and the flexing portion 34B at the lower portion of the bushing 20. Rattling and flexing of the headrest 13 therefore does not occur.

Figure 9B:
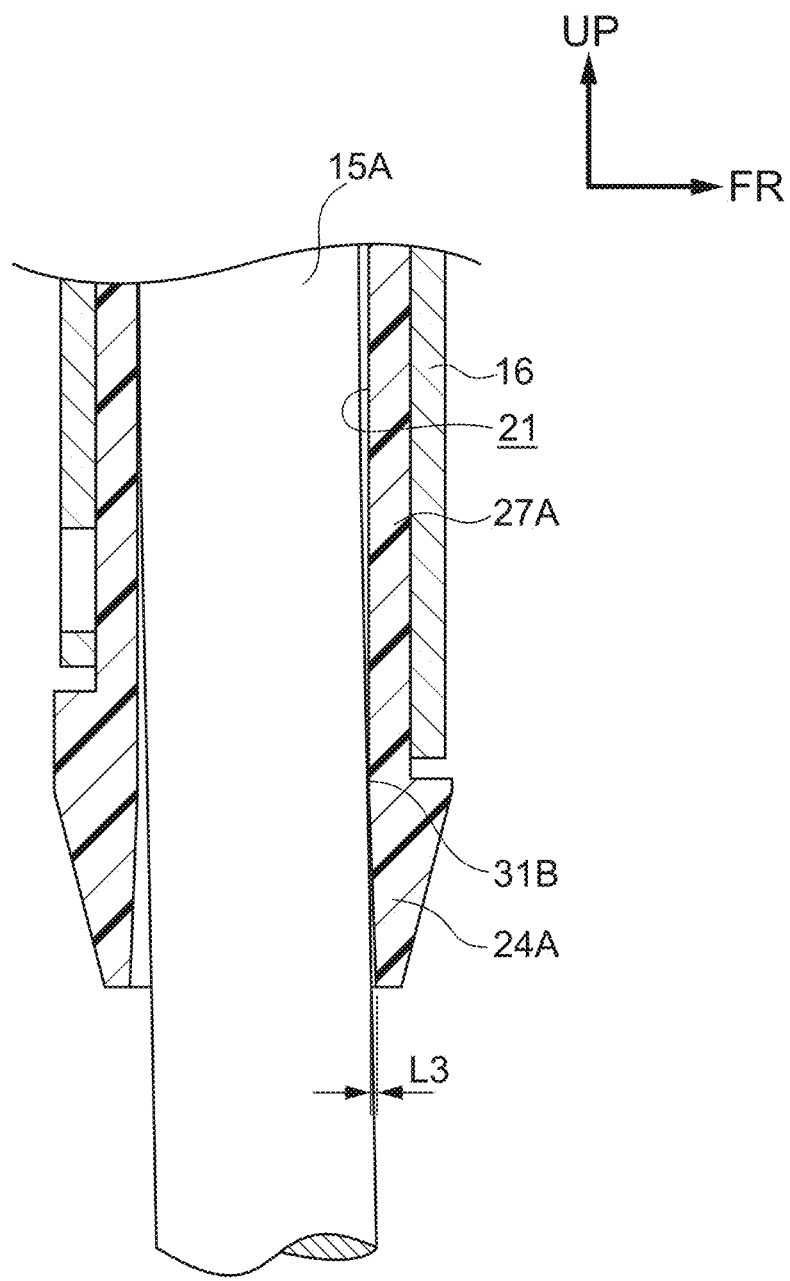

In the comparative example illustrated in FIG. 9A and FIG. 9B, in the headrest support structure that is supported at three points, the headrest stay 15A that bends slightly toward the vehicle rear side about the substantially central portion in the up-down direction has to be assembled to the bushing 20A. This is since it is necessary for the outer peripheral face of the headrest stay 15A and the inner wall face of the bushing 20A to abut each other at the support point 31C. However, in the present exemplary embodiment, the headrest stay 15 can be supported by being gripped at the upper portion and at the lower portion of the bushing 20. Accordingly, not only a headrest stay that is bent slightly toward the vehicle rear side about the substantially central portion in the up-down direction, but also the headrest stay 15 of the present exemplary embodiment that is formed in a straight line shape, may be employed.

In the present exemplary embodiment, the first support section 30A at the upper portion of the bushing 20 includes the fixed portion 32A on the vehicle rear side, and the second support section 30B at the lower portion of the bushing 20 includes the fixed portion 32B on the vehicle front side. In a vehicle rear-end collision, when force toward the vehicle rear acts due to the head H contacting the headrest body 14 (arrow F in FIG. 7), the headrest stay 15 attempts to lean toward the vehicle rear, such that force toward the vehicle rear arises at the upper portion of the bushing 20 and force toward the vehicle front arises at the lower portion of the bushing 20. Moreover, when force toward the vehicle rear acts on the headrest body 14, the fixed portions 32 provided at the support sections 30 at the upper portion and at the lower portion of the bushing 20 resist this force, thereby suppressing tilting of the headrest stay 15 toward the vehicle rear. Namely, bending rigidity can be secured in a rear-end collision.

Moreover, in the present exemplary embodiment, the first support section 30A at the upper portion of the bushing 20 includes the flexing portion 34A on the vehicle front side, and the second support section 30B at the lower portion of the bushing 20 includes the flexing portion 34B on the vehicle rear side. In a vehicle rear-end collision, when force toward the vehicle front acts on the headrest body 14 due to recoil, the headrest stay 15 attempts to lean toward the vehicle front. Accordingly, force toward the vehicle front arises at the upper portion of the bushing 20, and force toward the vehicle rear arises at the lower portion of the bushing 20. Moreover, when force toward the vehicle front acts on in the headrest body 14, the flexing portions 34 provided at the support sections 30 at the upper portion and at the lower portion of the bushing 20 flex, thereby ensuring tilting of the headrest stay 15 toward the vehicle front.

Due to the placement of the fixed portions 32 and the flexing portions 34 in the bushing 20 of the present exemplary embodiment, the headrest 13 does not readily flex toward the vehicle rear, but does readily flex toward the vehicle front, thereby enabling performance of the headrest to be secured in a rear-end collision.

Feature 3

The present exemplary embodiment has the feature of both preventing rattling and being easy to mold. Specifically, the insertion hole 21 of the present exemplary embodiment is formed with the demolding taper that increases in diameter on progression from a position at the height of the first support section 30A (line H-H in FIG. 3) toward the upper end, and increases in diameter on progression toward the lower end. Due to forming such a demolding taper, at the second support section 30B in the mold removal direction, a gap is formed between the second support section 30B and the headrest stay 15 in a state prior to assembling the holder 16, the bushing 20, and the headrest stay 15 together. In the present exemplary embodiment, inserting the bushing 20 into the holder 16 and inserting the headrest stay 15 into the insertion hole 21 of the bushing 20 closes the gap between the second support section 30B and the headrest stay 15. Namely, the second support section 30B and the headrest stay 15 can be placed in tight contact with each other at the position where the insertion hole 21 has an enlarged diameter due to providing the demolding taper. In particular, in the present exemplary embodiment, when the bushing 20 has been inserted into the holder 16, and the headrest stay 15 has been inserted into the insertion hole 21 of the bushing 20, the projections 37B that project out further than the outer wall face 29 press the flexing portion 34B toward the fixed portion 32B side. Moreover, the second support section 30B of the present exemplary embodiment includes the first groove portions 22A that partition the fixed portion 32B from the flexing portion 34B on both vehicle width direction sides. Accordingly, the width of the first groove portion 22A becomes narrower when the flexing portion 34B is pressed toward the fixed portion 32B side. In other words, the fixed portion 32B and the flexing portion 34B approach each other.

As described above, when the bushing 20 has been inserted into the holder 16 and the headrest stay 15 has been inserted into the insertion hole 21 of the bushing 20, the flexing portion 34B is pressed toward the fixed portion 32B side, such that the two components approach each other. Namely, the gap that was previously present between the inner wall face of the flexing portion 34B (the insertion hole 21) and the outer peripheral face of the headrest stay 15 is closed to make tight contact, such that the headrest stay 15 is gripped between the flexing portion 34B and the fixed portion 32B.

Contrast will now be made with the comparative example, with reference to FIG. 9B. Although the insertion hole 21 of the comparative example contacts the headrest stay 15 at the support point 31B, a gap L3 is present below the support point 31B due to the demolding taper. Moreover, the headrest stay 15 is not gripped in the vehicle front-rear direction in the vicinity of the support point 31B. Accordingly, rattling at the lower portion of the bushing 20A is liable to occur in the comparative example. By contrast, in the present exemplary embodiment, the support sections 30 and the headrest stay 15 can be placed in tight contact with each other as described above even with the demolding taper provided at the insertion hole 21. Accordingly, the headrest stay 15 is gripped in the vehicle front-rear direction, and rattling and flexing of the headrest 13 do not occur.

Feature 4

The flexing portions 34 of the present exemplary embodiment have the feature of the gripping force of the headrest stay 15 and operation force of the headrest 13 being adjustable by changing the width of the recess 38A. In the first support section 30A, design modifications to a width X1 of the recess 38A, illustrated in FIG. 5A, enable the gripping force of the headrest stay 15 and the operation force of the headrest 13 to be adjusted. For example, widening the width X1 increases the flex amount of the flexing portion 34A, and reduces the operation force since the gripping force between the flexing portion 34A and the headrest stay 15 decreases. On the other hand, making the width X1 narrower reduces the flex amount of the flexing portion 34A, and the operation force increases since the gripping force between the flexing portion 34A and the headrest stay 15 becomes greater. Moreover, in the second support section 30B, design modifications to a width X2 of the recess 38B illustrated in FIG. 6A enable the gripping force of the headrest stay 15 and the operation force of the headrest 13 to be adjusted. For example, widening the width X2 increases the flex amount of the flexing portion 34B, and reduces the operation force since the gripping force between the flexing portion 34B and the headrest stay 15 decreases. On the other hand, making the width X2 narrower reduces the flex amount of the flexing portion 34B, and the operation force increases since the gripping force between the flexing portion 34B and the headrest stay 15 becomes greater.

Feature 5

As illustrated in FIG. 4, in the present exemplary embodiment, the anchor portions 24 that anchor the bushing 20 to the holder 16 are provided projecting to the outside from the outer wall face 29 of the bushing 20 at their upper ends on both width direction side ends. Moreover, as illustrated in FIG. 3, in the present exemplary embodiment, the first groove portion 22A that partitions the fixed portion 32B from the flexing portion 34B, and the second groove portion 22B that is provided so as to run around the anchor portion 24 as viewed from the side of the vehicle, are provided on both vehicle width direction ends. The lower end of the first groove portion 22A is connected to the groove of the second groove portion 22B that extends in the vehicle front-rear direction. Accordingly, in the present exemplary embodiment, where the second groove portion 22B is configured by a groove formed in the same direction as the first groove portion 22A (the up-down direction), the second groove portion 22B functions not only to house the anchor portion 24 at the inner side of the outer wall face 29, but also functions to bring the fixed portion 32B and the flexing portion 34B closer together. Namely, imparting the second groove portion 22B with two functions enables the total length of the grooves formed in the bushing 20 to be reduced, thereby enabling the rigidity of the bushing 20 to be secured. Moreover, in the bushing 20, in cases in which the grooves are formed by machining, reducing the total length of the grooves enables both manufacturing time of the bushing 20 to be reduced and manufacturing costs of the bushing 20 to be suppressed.

Modified Examples

The flexing portions 34 of the present exemplary embodiment are each formed capable of flexing by providing the recess 38. In modified examples of the present exemplary embodiment, the flexing portion 34 is made capable of flexing by configurations other than the recess 38. Explanation follows regarding examples of application to the second support section 30B. Note that configurations that are the same as in the present exemplary embodiment are allocated the same reference numerals.

Figure 8A:
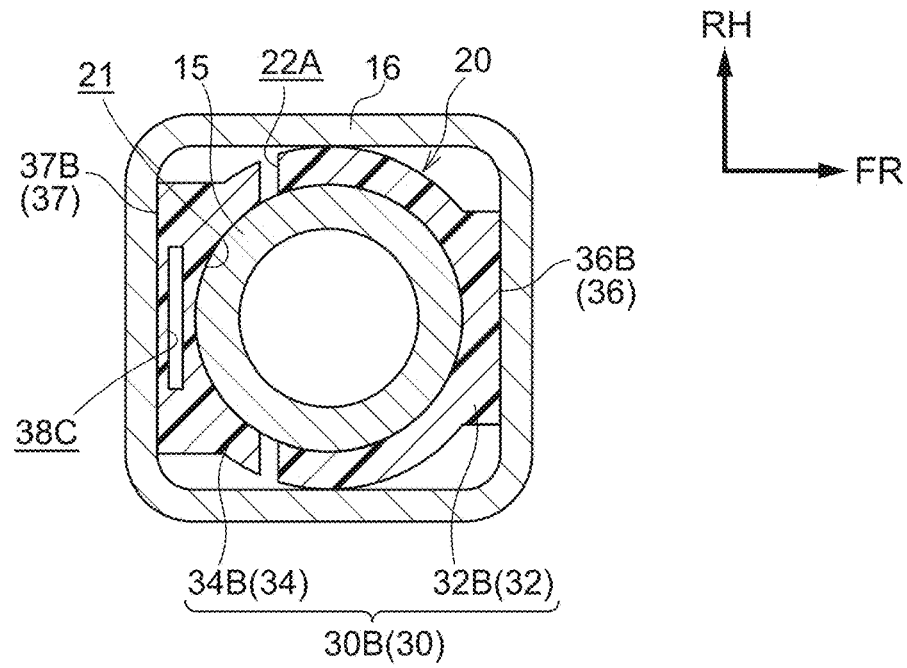
FIG. 8A and FIG. 8B are cross-sections from below of a holder, a second support section, and a headrest stay in a headrest support structure of a modified example of an exemplary embodiment.

FIG. 8A is a cross-section viewed from below, illustrating a holder 16, a second support section 30B, and a headrest stay 15 of Modified Example 1. The flexing portion 34B of Modified Example 1 is provided with an elongated hole 38C instead of the recess 38B. The elongated hole 38C is a hole extending in the insertion direction of the headrest stay 15, provided between the outer wall face and the inner wall face of the flexing portion 34B. Desirably, the elongated hole 38C is provided between the outer wall face and the inner wall face at the vehicle width direction center of the flexing portion 34B. In Modified Example 1, during insertion of the bushing 20 into the holder 16, when force toward the inner wall face side is applied to the projections 37B, the flexing portion 34B is capable of flexing about the elongated hole 38C so as to follow the outer peripheral face of the headrest stay 15.

Figure 8B:
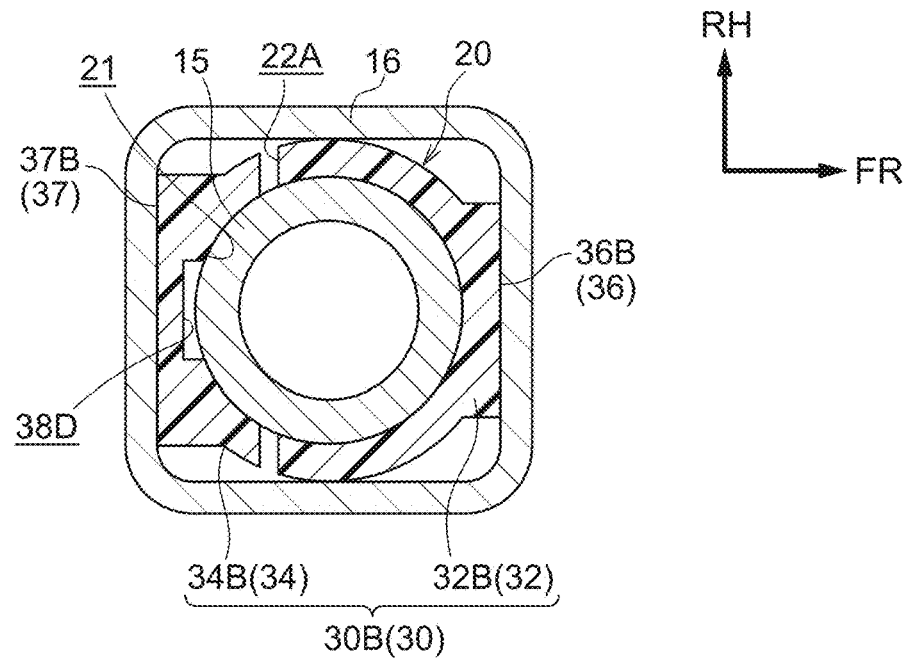

FIG. 8B is a cross-section viewed from below, illustrating a holder 16, a second support section 30B, and a headrest stay 15 of Modified Example 2. The flexing portion 34B of Modified Example 2 is provided with a recess 38D at the inner wall face instead of the recess 38B at the outer wall face side. The recess 38D is a groove extending in the insertion direction of the headrest stay 15 at the vehicle width direction center of the inner wall face of the flexing portion 34B. In Modified Example 2, during insertion of the bushing 20 into the holder 16, when force toward the inner wall face side is applied to the projections 37B, the flexing portion 34B is capable of flexing about the recess 38D so as to follow the outer peripheral face of the headrest stay 15.

Note that in addition to the above, modified examples of the present exemplary embodiment include configurations in which plural grooves extend along the insertion direction of the headrest stay 15 in the outer wall face of the flexing portion 34.

Configurations in which plural grooves extend along the insertion direction of the headrest stay 15 at the inner wall face of the flexing portions 34 are also included. Moreover, configurations in which plural holes are provided between the outer wall face and the inner wall face at the vehicle width direction center of the flexing portion 34 are also included.

Other Configurations

Note that the pair of support column portions of the headrest stay 15 of the present exemplary embodiment are formed in straight line shapes. However, there is no limitation thereto, and the support column portions may be bent slightly toward the rear side at substantially central portions in the up-down direction.

The demolding taper of the insertion hole 21 of the present exemplary embodiment increases in diameter on progression toward the upper end and the lower end. However, there is no limitation thereto. For example, configuration may be made in which the diameter increases on progression from the upper end toward the lower end, or configuration may be made in which the diameter increases on progression from the lower end toward the upper end. Note that in the former case, the mold that forms the insertion hole 21 is removed downward, and in the latter case, the mold that forms the insertion hole 21 is removed upward. Moreover, the cross-section profile of the insertion hole 21 is not limited to being circular, and may be elliptical. In cases in which the cross-section profile of the insertion hole 21 is elliptical, it is sufficient that the support section 30 be formed capable of gripping in the vehicle front-rear direction.

Explanation has been given regarding an exemplary embodiment and modified examples of the present disclosure. However, the present disclosure is not limited to the above, and obviously various other modifications may be implemented within a range not departing from the spirit of the present disclosure.

What is claimed is:

1. A headrest support structure comprising:
   a headrest body that is provided above a seatback and that supports a head of an occupant;
   a bushing that is inserted into a tube-shaped retention section provided at an upper end portion of the seatback; and
   a headrest stay that comprises an upper end portion fixed to the headrest body and a lower end portion inserted into an insertion hole provided in the bushing such that the headrest stay enables movement of the headrest body in a vehicle up-down direction,
   the bushing comprising a support section that supports the headrest stay in the bushing, and the support section including:
      a fixed portion that is abutted against an outer peripheral face of the headrest stay, and
      a flexing portion that is provided on an opposite side of the headrest stay from the fixed portion, and that is capable of flexing so as to be abutted against the outer peripheral face of the headrest stay when the bushing has been inserted into the retention section and the headrest stay has been inserted into the bushing.

2. The headrest support structure of claim 1, wherein the flexing portion comprises a recess extending in an insertion direction of the headrest stay in a face opposing an inner wall face of the retention section.

3. The headrest support structure of claim 1, wherein the support section comprises:
   a first support section that is provided at an upper portion of the bushing, and that supports the headrest stay with the flexing portion at a vehicle front side and with the fixed portion at a vehicle rear side; and
   a second support section that is provided at a lower portion of the bushing, and that supports the headrest stay with the fixed portion at the vehicle front side and with the flexing portion at the vehicle rear side.

4. The headrest support structure of claim 3, wherein:
   the insertion hole in the bushing has a tapered profile prior to assembly of the bushing with the retention section and the headrest stay;
   a smallest internal diameter of the insertion hole in a vehicle front-rear direction is at one of the support sections of the first support section and the second support section;
   the insertion hole has a larger internal diameter in the vehicle front-rear direction at the other of the support sections of the first support section and the second support section than at the one support section; and
   the other support section comprises, at the flexing portion, a protrusion that presses the flexing portion toward a fixed portion side when the bushing has been inserted into the retention section and the headrest stay has been inserted into the bushing.

5. The headrest support structure of claim 4, wherein the other support section comprises a first groove portion that partitions the fixed portion from the flexing portion at each vehicle width direction side of the other support section.

6. The headrest support structure of claim 5, wherein:
   the other support section is the second support section;
   the bushing comprises:
      an anchor portion on each vehicle width direction side below the second support section, each anchor portion projecting from an outer wall face of the bushing, and anchoring the bushing to the retention section, and
      a second groove portion provided so as to run around each of the anchor portions in vehicle side view in order to house the anchor portion at an inner side of the outer wall face of the bushing; and
   the first groove portion is connected to the second groove portion.

7. The headrest support structure of claim 1, wherein the support section makes tight contact between the support section and the headrest stay and between the support section and the retention section.

8. The headrest support structure of claim 1, wherein the flexing portion comprises a recess extending in an insertion direction of the headrest stay in a face opposing the outer peripheral face of the headrest stay.

9. The headrest support structure of claim 1, wherein the flexing portion comprises an elongated hole extending in an insertion direction of the headrest stay between a face opposing an inner wall face of the retention section and a face opposing the outer peripheral face of the headrest stay.

* * * * *